United States Patent
Yamamoto et al.

(10) Patent No.: US 7,182,346 B2
(45) Date of Patent: Feb. 27, 2007

(54) MULTISTAGE OIL SEAL AGAINST DIFFERENT CUTTING FLUIDS FOR A MACHINE TOOL MOTOR

(75) Inventors: Tomonaga Yamamoto, Yamanashi (JP); Isao Kariya, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 30 days.

(21) Appl. No.: 10/905,395

(22) Filed: Dec. 30, 2004

(65) Prior Publication Data

US 2005/0151449 A1 Jul. 14, 2005

(30) Foreign Application Priority Data

Jan. 9, 2004 (JP) .............................. 2004-004311

(51) Int. Cl.
  *F16J 15/32* (2006.01)
(52) U.S. Cl. ..................................... 277/551; 277/562
(58) Field of Classification Search ................ 277/549, 277/551, 556, 559, 562, 572
  See application file for complete search history.

(56) References Cited

U.S. PATENT DOCUMENTS

| 3,413,008 | A | * | 11/1968 | Greiner | 277/505 |
|---|---|---|---|---|---|
| 3,434,727 | A | * | 3/1969 | Kollenberger | 277/577 |
| 3,601,417 | A | * | 8/1971 | Szepesvary | 277/556 |
| 3,773,336 | A | * | 11/1973 | Walter et al. | 277/551 |
| 3,934,311 | A | * | 1/1976 | Thompson | 452/13 |
| 4,021,049 | A | * | 5/1977 | Phelps et al. | 277/551 |
| 4,910,987 | A | * | 3/1990 | Woodrow | 72/237 |
| 5,009,435 | A | * | 4/1991 | Villanyi et al. | 277/552 |
| 5,105,636 | A | * | 4/1992 | Anastase et al. | 68/140 |
| 5,411,273 | A | * | 5/1995 | Pietsch et al. | 277/309 |
| 5,639,227 | A | * | 6/1997 | Mills | 417/423.11 |
| 6,152,454 | A | * | 11/2000 | Marnot | 277/551 |
| 6,196,551 | B1 | * | 3/2001 | Zellers | 277/402 |
| 6,293,558 | B1 | | 9/2001 | Crapart | |
| 6,474,652 | B1 | * | 11/2002 | Hosoya et al. | 277/358 |
| 6,736,403 | B2 | * | 5/2004 | Kreutzer | 277/551 |
| 2001/0030398 | A1 | * | 10/2001 | Hosokawa et al. | 277/549 |
| 2003/0173746 | A1 | * | 9/2003 | Ramsay | 277/549 |
| 2004/0007821 | A1 | * | 1/2004 | Ramsay | 277/353 |
| 2004/0124591 | A1 | * | 7/2004 | Sekulich et al. | 277/645 |

FOREIGN PATENT DOCUMENTS

| EP | 1 146 265 A2 | 10/2001 |
|---|---|---|
| GB | 1 202 061 A | 8/1970 |
| JP | 2002-139156 | 5/2002 |

* cited by examiner

*Primary Examiner*—Robert Canfield
*Assistant Examiner*—Gay Ann Spahn
(74) *Attorney, Agent, or Firm*—Drinker Biddle & Reath LLP

(57) ABSTRACT

A multistage oil seal (4) includes a plurality of lips (7a, 7b, 7c) in a plurality of stages disposed around a motor shaft (1) of a machine tool along the axis of the motor shaft to protect internal members of the motor from the cutting fluid. All or at least two of the lips (7a, 7b, 7c) in the plurality of stages are formed from different materials.

4 Claims, 2 Drawing Sheets

MULTISTAGE OIL SEAL AGAINST DIFFERENT CUTTING FLUIDS FOR A MACHINE TOOL MOTOR

BACKGROUND OF THE INVENTION

1. Field of the Invention

The present invention relates to a multistage oil seal for a motor used in a machine tool and to a machine tool motor using the oil seal.

2. Description of the Related Art

An oil seal of rubber or the like is generally used in the shaft seal part of various machines in order to prevent the leakage of the sealed fluid or the intrusion of foreign matter such as a liquid, or the like, from the outside.

In a machine tool, a workpiece is machined with a tool while a cutting fluid is ejected to the machined area to cool it. Accordingly, the cutting fluid is liable to fly in all directions and intrude into the inside of the machine tool. To prevent this inconvenience, an oil seal is disposed around the rotary shaft or the like to keep the cutting fluid out of the internal mechanism of the machine tool.

As an example of such an oil seal, a rotational oil seal is known, as described as a prior art in Japanese Unexamined Patent Publication No. 2002-139156, in which a plurality lips in a plurality of stages for closely contacting with a peripheral surface of a rotary shaft are disposed along an axis of the rotary shaft in a sealing portion formed along the peripheral surface of the rotary shaft to secure pressure resistance for an improved seal effect.

In recent years, on the other hand, various cutting fluids have been developed to improve the machining efficiency of the machine tool, and each machine tool user conducts the machining using the most suitable cutting fluid among them. Therefore, depending on the components of the cutting fluid used, a chemical change or a swelling can occur in the oil seal lip, thereby resulting in a reduced seal function or a sealing failure.

The cutting fluid for use with a machine tool can be selected as desired by the user of the machine tool, and therefore cannot be predicted by the machine tool manufacturer. This poses a problem that it is difficult to make a lip, used for an oil seal to prevent the intrusion of a cutting fluid, from a material suitable for preventing the deterioration of the seal function due to the chemical change or the swelling, for all possible cutting fluids.

SUMMARY OF THE INVENTION

Accordingly, it is an object of the present invention to provide a multistage oil seal for a machine tool motor which can obviate the problem described above and secure the seal function against different kind of cutting fluids.

In order to achieve the object described above, the present invention provides a multistage oil seal for a machine tool motor, which includes a plurality lips in a plurality of stages disposed around an axially extending motor shaft of the machine tool along the axis of the motor shaft to protect internal members of the motor from the cutting fluid, wherein all or at least two of the lips in the plurality of stages are formed from different materials.

In the multistage oil seal for the machine tool motor described above, the lips in plurality of stages are preferably removably mounted on a lip base. Also, at least one of the lips may be integrated with a lip base, and the remaining lips may be removably mounted on the lip base.

The present invention also provides a machine tool motor using the multistage oil seal described above.

In the configuration of the multistage oil seal for the machine tool motor according to the present invention, the lips formed from different materials present different seal functions against the cutting fluids of different components, and therefore the seal function is secured against different kind of cutting fluids.

BRIEF DESCRIPTION OF THE DRAWINGS

The above and other objects, features and advantages of the present invention will be described in more detail below based on the preferred embodiments of the present invention with reference to the accompanying drawings, wherein.

DESCRIPTION OF THE PREFERRED EMBODIMENTS

Embodiments of the present invention will be described in detail below with reference to the drawings.

Figure 1:
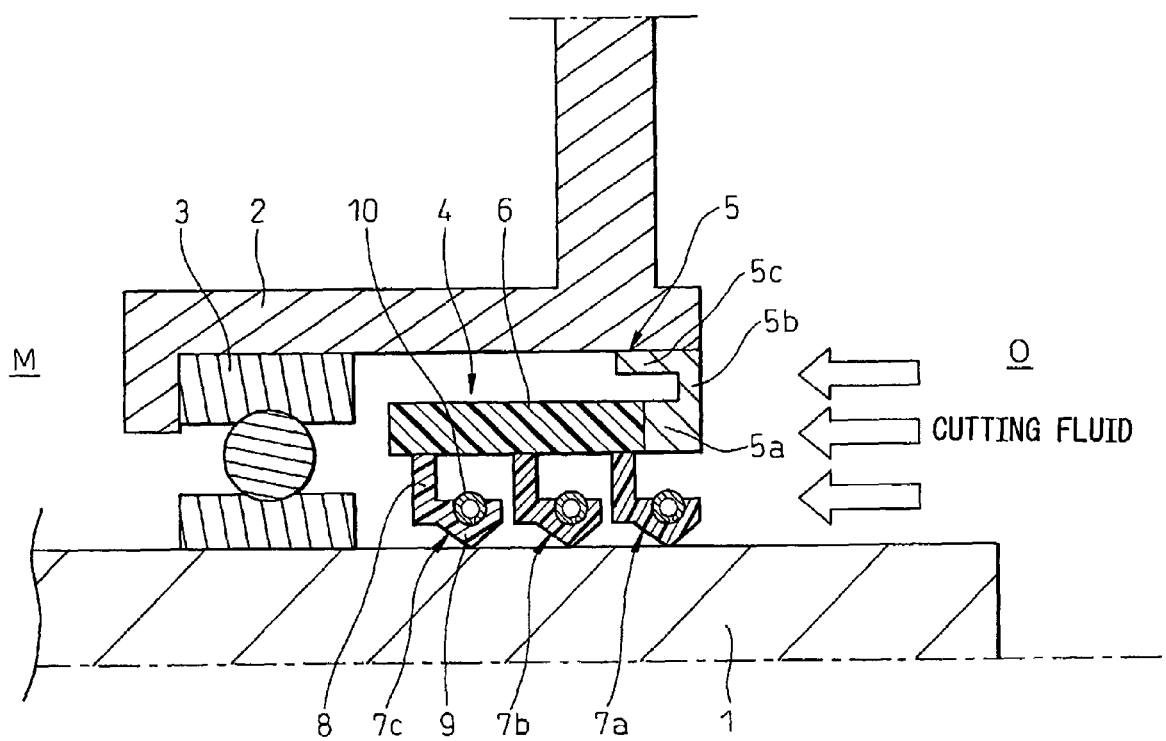
FIG. 1 is an enlarged sectional view of a shaft seal part of a motor shaft of a machine tool motor on which a multistage oil seal according to the present invention is mounted.

FIG. 1 is an enlarged sectional view of a shaft seal part of a motor shaft of a machine tool motor having a multistage oil seal according to the present invention. In FIG. 1, reference numeral 1 designates a motor shaft for driving a main spindle or a feed shaft of a machine tool. The motor shaft 1 is supported by a housing 2 through a bearing 3 so as to be rotatable with respect to the housing 2. The forward end portion of the motor shaft 1 is projected from the housing 2 into an external area O where a cutting fluid flies in all directions. A multistage oil seal 4 is provided at the end of the housing 2 so as to close an annular gap between an inner peripheral surface of the housing 2 and an outer peripheral surface of the motor shaft 1, and protects internal members of the motor from chips and the cutting fluid flying in all directions from the cutting area O.

The multistage oil seal 4 shown in FIG. 1 includes an annular fitting member 5 made of iron, a lip base 6 made of a rubber-like elastic material, and lips 7a, 7b, 7c made of a rubber-like elastic material and juxtaposed in a plurality of stages along an axis of the motor shaft 1. In this embodiment, the lips 7 are formed in three stages along the axis of the motor shaft 1. In this specification, the plurality of the stages are called the first stage, the second stage and the third stage, respectively, toward the interior M of the housing 2 in the ascending order of distance from the area O where the cutting fluid flies in all directions. The fitting member 5 includes a tubular inner peripheral portion 5a, a flange portion 5b extending outward radially from one end of the inner peripheral portion 5a, and an outer peripheral portion 5c having a peripheral wall shape and formed by axially folding back the outer end of the flange portion 5b toward the interior M of the housing 2, which are integrated together. The outer peripheral portion 5c of the fitting member 5 is in close contact with the inner peripheral surface of the housing 2.

The other end (the end portion directed toward the interior M of the housing 2) of the inner peripheral portion 5a of the fitting member 5 is formed with a tubular lip base 6 along the outer peripheral surface of the motor shaft 1. The inner and outer surfaces of the lip base 6 are flush with the inner and outer surfaces of the inner peripheral portion 5a of the fitting member 5, respectively. The lips 7a, 7b, 7c of a rubber-like elastic material are provided in a plurality of stages along the axial direction so as to be in close contact with the outer peripheral surface of the motor shaft 1. Each of the lips 7a, 7b, 7c includes a fin 8 extending toward the motor shaft 1 from the lip base 6, a main lip portion (closely contacted portion) 9 having an angle-shaped cross section adapted to be in close contact with the outer peripheral surface of the motor shaft 1 at the forward end of the fin 8, and a spring 10 fitted into the outer periphery of the main lip portion 9 for applying a pressing force to the main lip portion 9.

The present invention is intended to secure the seal function against various cutting fluids. For this purpose, at least two of the lips in the plurality of stages are formed from different materials from each other. In the case of FIG. 1, all of the lips from the lip 7a in the first stage to the lip 7c in the third stage are formed from different materials from each other. For example, the lip 7a of the lips 7 in the first stage is formed from acryl rubber, the lip 7b thereof in the second stage from silicon rubber and the lip 7c thereof in the third stage from fluoro rubber. Also, the lip base 6 is formed from H-NBR (hydrogenated nitrile rubber). Since the lips in the plurality of stages are formed from different materials from each other in this way, any of the lips can give the seal performance against each of the cuttings fluids of different components and thus prevents the intrusion of objects to be sealed. Thus, the seal function is secured against various cutting fluids.

Figure 2A:
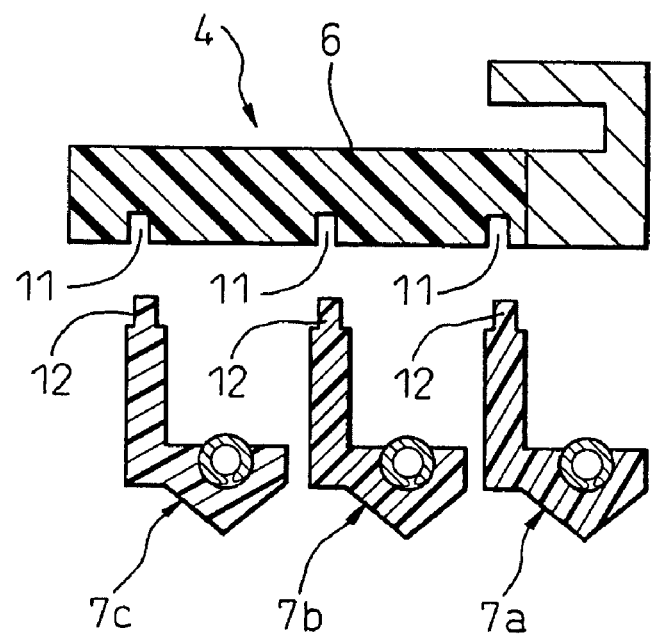
FIG. 2A is a sectional view of the multistage oil seal with the lips removably mounted on a lip base according to a first embodiment of the present invention.

To facilitate the fabrication of the multistage oil seal according to the present invention, each of the lips in the plurality of stages is preferably adapted to be removably mounted on the lip base 6. FIG. 2A shows an embodiment in which all of the lips in the plurality of the stages are removably mounted on the lip base 6. The means for allowing the lips to be removably mounted on the lip base 6 include grooves (depression) 11 formed on the inner peripheral surface of the lip base 6 and protrusions (convex portion) 12 formed at the root of each lip. The mating of the grooves 11 and the protrusions 12 allows the lips to be removably mounted on the lip base 6. This configuration makes it possible to fabricate the lips 7a, 7b, 7c as parts separate from the lip base 6. This allows a different material to be employed for a different part and facilitates the fabrication of the lips. In FIG. 2A, the materials of the lips 7a, 7b, 7c are different from each other.

Figure 2B:
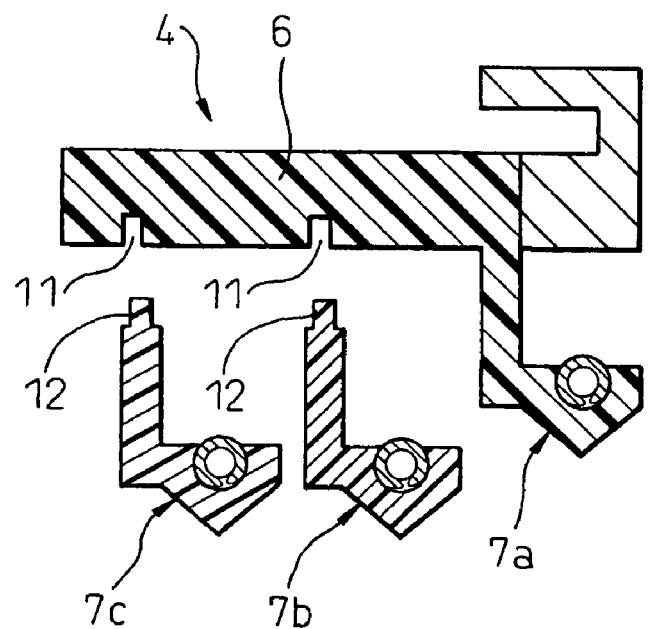
FIG. 2B is a sectional view of the multistage oil seal with the lips removably mounted on a lip base according to a second embodiment of the present invention.

FIG. 2B shows an embodiment in which at least one lip is integrated with the lip base 6 and the remaining lips are removably mounted on the lip base 6. According to the embodiment shown in FIG. 2B, the lip 7a in the first stage is integrated with the lip base 6, while the lip 7b in the second stage and the lip 7c in the third stage are removably mounted on the lip base 6. The means for allowing the lips to be removably mounted on the lip base 6 include, similarly to the embodiment shown in FIG. 2A, the grooves 11 and the protrusions 12 which are adapted to mate with each other. This configuration allows at least one lip to be integrated with the lip base. As an alternative, the lip base 6 may be integrated with a plurality of lips formed from different materials.

In the embodiments described above, the lips in the plurality of stages are provided side by side along the axis of the motor shaft 1 and all of the lips are formed from materials different from each other. However, all that is required in the present invention is that the lip in one stage is formed from a material different from those of the lips in other stages, and an embodiment in which the lips in at least two of the plurality of stages are formed from materials different from each other is possible.

While the present invention has been described with reference to the embodiments shown in the accompanying drawings, these embodiments are only illustrative but not limitative. Therefore, the scope of the present invention is only limited by the appended claims, and the preferred embodiments of the present invention can be modified or changed without departing from the scope of the claims.

What is claimed is:

1. A multistage oil seal suitable for a machine tool motor, comprising a plurality of lips in a plurality of stages to be disposed around an axially extending motor shaft of said machine tool along the axis of said motor shaft to protect internal members of said motor from the cutting fluid, wherein all or at least two of said lips in the plurality of stages are formed from different materials, said lips in the plurality of stages are removably mounted on a tubular lip base, said tubular lip base being mounted to a fitting member having a tubular inner peripheral portion, a flange portion extending outward radially from one end of the inner peripheral portion, and an outer peripheral portion formed by axially folding back the outer end of the flange portion;

the outer peripheral portion of said fitting member is used for fixing said oil seal to the machine tool motor; and said lip base is mounted to the inner peripheral portion of said fitting member.

2. The multistage oil seal according to claim 1, wherein at least one of said plurality of lips is integrated with the lip base, and remaining ones of the plurality of lips are removably mounted on the lip base.

3. A machine tool motor using said multistage oil seal according to claim 1.

4. The machine tool according to claim 3, wherein at least one of said plurality of lips is integrated with the lip base, and remaining ones of the plurality of lips are removably mounted on the lip base.

* * * * *